United States Patent [19]
Kahl et al.

[11] Patent Number: 4,772,797
[45] Date of Patent: Sep. 20, 1988

[54] CEILING MOUNTED PASSIVE INFRARED INTRUSION DETECTOR WITH PRISMATIC WINDOW

[75] Inventors: William Kahl, Brookfield; John Baldwin, Danbury, both of Conn.

[73] Assignee: Cerberus AG, Mannendorf, Switzerland

[21] Appl. No.: 905,166

[22] Filed: Sep. 8, 1986

[51] Int. Cl.[4] .................................... G01J 5/08
[52] U.S. Cl. .................................... 250/353; 250/342; 340/567; 350/452
[58] Field of Search ................ 250/342, 353; 340/567, 340/600; 350/452

[56] References Cited

U.S. PATENT DOCUMENTS

| | | | |
|---|---|---|---|
| 4,275,303 | 6/1981 | Mudge | 250/342 |
| 4,321,594 | 3/1982 | Galvin et al. | 340/567 |
| 4,442,359 | 4/1984 | Lederer | 250/342 |
| 4,447,726 | 5/1984 | Mudge et al. | 250/342 |
| 4,451,734 | 5/1984 | St. Jean et al. | 250/342 |
| 4,484,075 | 11/1984 | Kahl et al. | 250/342 |
| 4,510,488 | 4/1985 | St. Jean et al. | 340/567 |
| 4,535,240 | 8/1985 | Vigurs | 250/342 |
| 4,573,758 | 3/1986 | Hecker et al. | 350/3.71 |

*Primary Examiner*—Janice A. Howell
*Assistant Examiner*—Constantine Hannaher
*Attorney, Agent, or Firm*—Brumbaugh, Graves, Donohue & Raymond

[57] ABSTRACT

A ceiling mounted passive infrared intrusion detector includes a window which has an exterior surface with ridges formed of intersecting planes, which are arranged to provide internal reflection of radiation received from selected angles with respect to the optical axis of the device and to deflect such radiation into a direction parallel to the optical axis. Focusing means arranged as part of the detector focuses the parallel infrared radiation onto a detecting element within the device.

14 Claims, 2 Drawing Sheets

CEILING MOUNTED PASSIVE INFRARED INTRUSION DETECTOR WITH PRISMATIC WINDOW

BACKGROUND OF THE INVENTION

The present invention relates to a passive infrared intrusion detector, and particularly to such detectors which are arranged for mounting to the ceiling of a room or other space to be protected.

U.S. Pat. No. 4,275,303, which is assigned to the same assignee as the present invention, describes a passive infrared intrusion detector which includes an enclosure having an aperture with a multi-segment Fresnel lens which is provided for focusing infrared energy onto a sensing element within the enclosure. The device described in the referenced patent, and many other prior art passive infrared intrusion detectors, are arranged for mounting to the wall of a room to be protected, so that the beams of infrared sensitivity radiate outward from the wall, often in multiple directions.

It is an object of the present invention to provide a new and improved passive infrared intrusion detector, which is is arranged for mounting to the ceiling of a room to be protected, whereby beams of infrared sensitivity can radiate in many directions and reach areas throughout the room, which might be otherwise blocked from observation by a single wall mounted detector.

SUMMARY OF THE INVENTION

In accordance with the present invention there is provided an improvement in an optical system for a device having an enclosure with an aperture and an optical transducer within the enclosure and focusing means, having at least one optical axis for focusing radiation passing through the aperture onto the transducer. The improvement comprises a light deflecting window mounted in the aperture and formed of refractive material, the window having an outer surface portion formed as a plurality of parallel ridges formed by intersecting planes, the intersecting planes having apex angles arranged to internally reflect radiation between the direction of the optical axis within the enclosure and a selected viewing angle outside the device.

In a preferred embodiment as a passive infrared intrusion detector, arranged to be mounted to a ceiling, which has an infrared sensing element mounted within the enclosure, the intersecting planes have angles arranged to internally reflect radiation originating from a region of space at a desired viewing angle in a plane perpendicular to the ridges to a direction corresponding to the optical axis of the device. There may be provided a plurality of window portions on the outer surface of the window, each having the ridges at a different ridge direction on the surface, so that radiation is reflected between a plurality of viewing angles and the direction of the optical axis. A planar portion may be provided on the outer window surface to provide a downwardly looking beam of infrared sensitivity. In a preferred embodiment a Fresnel lens may be provided on the interior surface of the window for focusing infrared radiation. The window may have further segments which have focusing lenses formed therein for focusing infrared radiation on to the detector from other viewing angles. The sensing element may be a multiple electrode sensing element, e.g. a dùal electrode sensing element, wherein the electrodes are spaced in a direction parallel to the direction of ridges on a window portion that are approximately parallel to the ridges of the Fresnel lens on the inside of the window. The electrodes of the sensing element are preferably spaced so that the angle between the electrodes, as viewed from the focusing means, is at least equal to approximately one-third the angle between adjacent ones of the viewing angles of the system.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
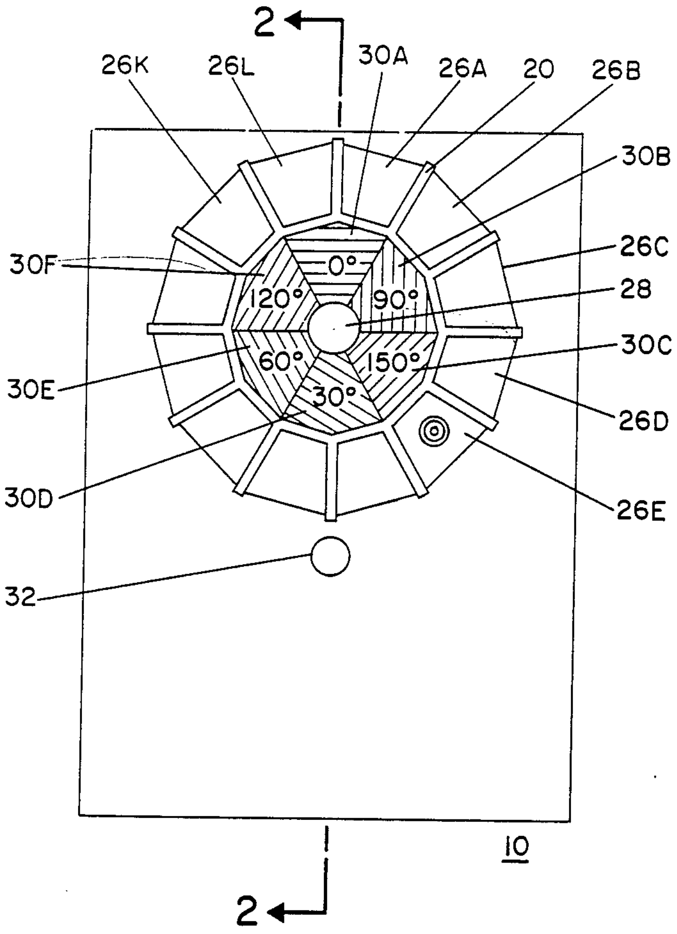
FIG. 1 is a bottom view of a passive infrared intrusion detector in accordance with the present invention.
Figure 2:
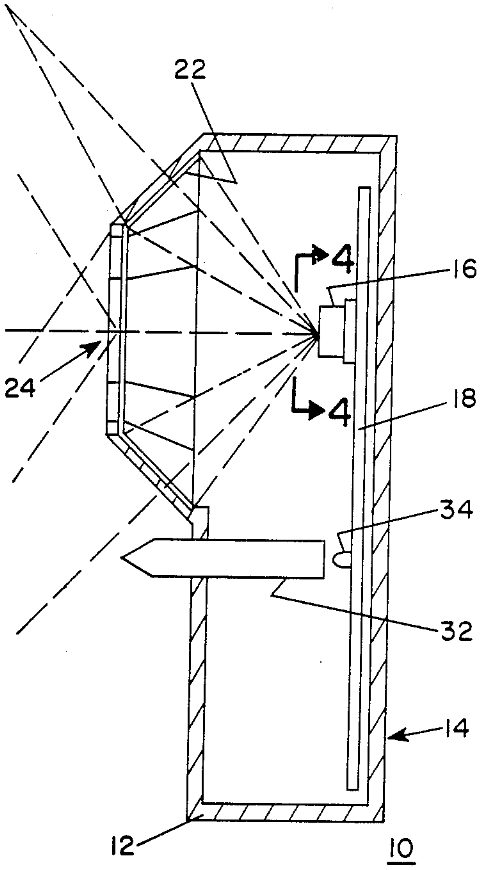
FIG. 2 is a side cross-sectional view of the passive infrared intrusion detector of FIG. 1.
Figure 3:
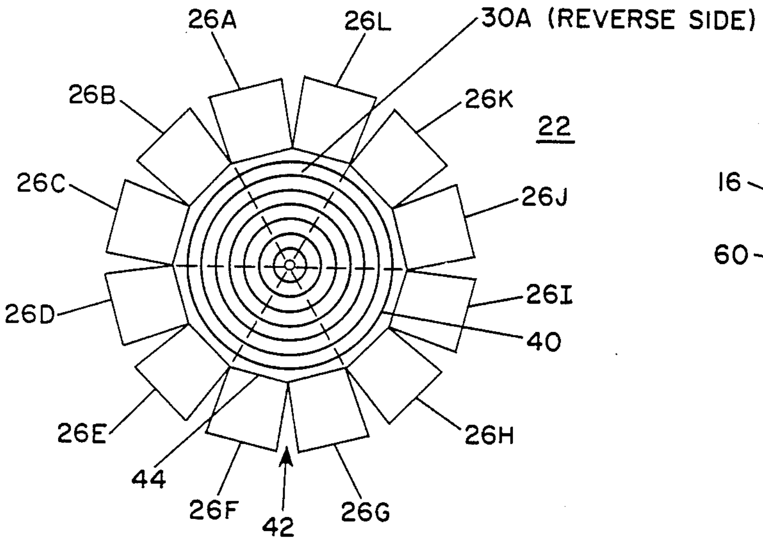
FIG. 3 is a view of the inside of the window and Fresnel lens used in the infrared instrusion detector of FIG. 1.

Referring to FIGS. 1 and 2 there is shown a passive infrared intrusion detector 10 in accordance with the present invention. The intrusion detector 10 includes a housing 12 having a mounting surface 14 which is arranged to mount onto the ceiling or other similar surface of a room or area to be protected. The enclosure includes a sensing element 16, typically a dual element pyro-electric sensor of the type well-known to those skilled in the art. The wall of housing 12, which is opposite to surface 14 includes an aperture region which is provided with a window 22 hich is retained in position by a window frame 20. Window 22 includes a central region, which is approximately circular in configuration, and is indicated generally by reference numeral 24. Central region 24 of window 22 includes an outwardly facing central portion 28 which has a planar outer surface and a plurality of second segments 30A through 30F which surround central segment 28 and are provided with ridges forming prismatic surfaces as will be further described. Outside of the second set of segments 30A through 30F there are provided a third set of window segments 26A through 26F, which have Fresnel lens focusing surfaces on the outside thereof for purposes of forming additional beams of infrared sensitivity. Window 22 is formed from a flat piece of lens material as shown from the reverse side in FIG. 3. The central region, which includes central segment 28 and segments 30A through 30F is provided with a Fresnel lens 40 on the reverse side for purposes of focusing radiation, as will be further described. Surrounding the central region there are provided the additional lens segments 26A through 26L, which have slots 42 of a wedge configuration formed therebetween, so that segments 26 may be folded out of the plane of central section 40 to form a dome like configuration and be retained in the dome shaped ribs of frame 20 provided on housing 12.

Each of lens segments 26 of window 22 are provided with a Fresnel lens illustrated in FIG. 1 which is approximately centrally positioned on segments 26 and forms a beam of infrared sensitivity which is focused on detecting element 16 from angles of 45° from the vertical downwardly pointing axis of detector 10 and at azimuth angles spaced at 30°. The formation of these beams of infrared sensitivity is by means of focusing by the Fresnel lenses and their physical arrangement with respect to sensing element 16. Each of window segments 30A through 30F form two beams of infrared sensitivity in directions which have an elevation angle of 60° with respect to the vertical axis of the detector and at azimuth angles which are 180° apart for each segment. Accordingly, segment 30A, as seen in FIG. 1, forms beams at angles of 0° and 180° in azimuth. Each of the other segments 30 have prism ridges, as will be further described which form two beams 180° apart in azimuth, and the azimuth angles between the ridges of the various segments 30 have ridge directions which form a total of 12 beams spaced 30° apart through 360° of azimuth, resulting in beams of infrared sensitivity located every 30° in azimuth over 360° of azimuth angle at 60° elevation angle from vertical.

Figure 5:
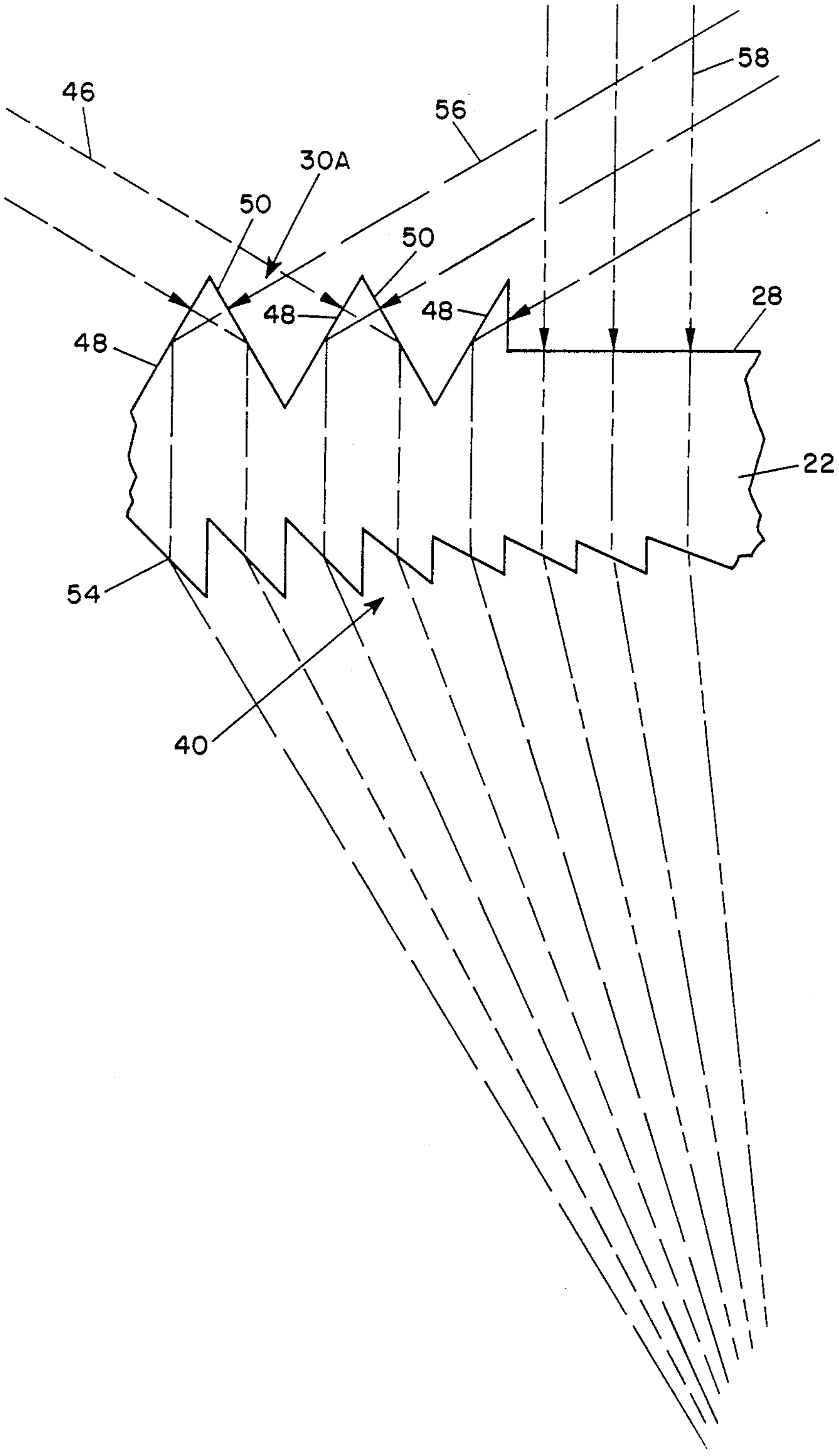
FIG. 5 is an enlarged view of a portion of the window and Fresnel lens of the FIG. 1 detector for purposes of illustrating the principals of operation thereof.

The operation of the window 22 for beam forming in the central region which includes central segment 28 and surrounding segments 30A through 30F is illustrated schematically in FIG. 5. It will be recognized by those skilled in the art that the drawing of FIG. 5 is not intended to be to exact scale, but is intended to generally indicate the operating principals of the window segments 28 and 30.

Referring to FIG. 5 there is shown an enlarged cross-section of a portion of window 22 near the central region of the window. The central portion 28 has a planar exterior surface, as indicated, and the outer region 30A, as shown in the cross-section, A has a prismatic cross-section, which is characterized by ridges formed by intersecting planes which meet at an angle of 60° at the outer and inner intersections. The ridges have a thickness of approximately 0.025 inches, and the solid portion of window 22 has similar thickness. Accordingly, planes 48 meet planes 50 at a 60° angle on the outer and inner apexes of the ridges. The inner surface 40 of window 22 is formed with ridges 54, which have varying angles and depths to form a Fresnel lens. The Fresnel lens of ridges 54 is arranged to focus radiation which is parallel within window 22 to converge on a focal point which corresponds to the position of sensing element 16.

Region 30A of window 22 has prisms formed by planar surfaces 48 and 50, which are arranged to reflect internally infrared radiation incident on segment 30A from angles of 60° from the elevation axis. The incident radiation comes from angles of plus and minus 60° measured in a plane which is perpendicular to the ridges formed by planar surfaces 48 and 50. Accordingly, incident radiation indicated by dotted lines 46 enters the prismatic surface through surfaces 48 and is internally reflected by surfaces 50 to a direction which is parallel to the vertical axis of window 22. Upon striking Fresnel lens surface 54 this radiation is focused to a focal point corresponding to the position of sensing element 16. Likewise, radiation incident from a direction which is on the opposite side of the vertical axis at an angle of 60°, indicated by incident lines 56, passes through perpendicular surfaces 50 and is reflected by surface 48, to be in a similar parallel direction within window 22. This radiation is also focused by the surfaces of Fresnel lens 54 on the inner surface of window 22 to the same focal point. The central region 28 of window 22 has a planar exterior surface so that perpendicular incident radiation 58, which is along the vertical axis of the detector continues in a straight direction within window 22 and is thereafter focused to the same sensing element. Accordingly, the sections of window 22 illustrated in FIG. 5 have the capability of forming beams of infrared sensitivity in three directions. Directions 46 and 56 are at elevation angles of 60° with respect to the vertical orientation of the device of FIG. 1 and incident direction of infrared sensitivity 58 is along the vertical axis. Referring to FIG. 1, it may be seen by those skilled in the art that the varying directions of the ridges forming the exterior prismatic surfaces in sections 30A through 30F enable the formation of beams of infrared sensitivity at incident angles with respect to the vertical of 60° and at varying azimuth angles spaced by 30° over a range of 360°. Each of segments 30A through 30F form two beams of infrared sensitivity oriented 180° to each other so that there is a total of 12 beams of infrared sensitivity oriented uniformly throughout 360° of azimuth.

The detector indicated in FIGS. 1 and 2 includes an alarm indicating light emitting diode 34 which is mounted to circuit board 18 which also holds sensing element 16. A light tube 32 is provided, which passes through the housing 12 and has a conical end which provides for visibility of the light emitting diode 34 through 360° of azimuth and over more than 60° elevation relative to unit vertical axis, for purposes of walk-testing the device upon installation.

Figure 4:
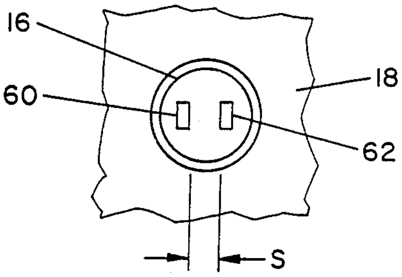
FIG. 4 is an enlarged planar view of the sensing element used in the passive infrared intrusion detector or FIG. 1.

Another feature of the intrusion detector in accordance with the invention is that sensing element 16, which is typically a dual electrode sensing element, has a large spacing S of about 4 mm between sensing electrode 60 and sensing electrode 62, as shown in detail in FIG. 4. The enlarged spacing S provides for a larger separation of dual beams of infrared sensitivity which are formed by each of the segments of window 22. It will be recognized that one set of dual beams is formed by central section 28 of window 22 in a direction which corresponds to the vertical axis. An additional 12 sets of dual beams are formed by sections 30A through 30F, each of these dual beams at an angle in elevation corresponding to 60° from the vertical axis, and the total of 12 beams having spacings of 30° around 360° of azimuth. Outer sections 26A through 26L have their own independent focusing arrangement formed by an outwardly facing Fresnel lens and form an additional 12 dual sets of beams of infrared sensitivity oriented at an angle of 45° from the vertical axis and at equally spaced angles of 30° around 360° of azimuth. The enlarged spacing S of the electrodes 60 and 62 of the sensing element provides for a relatively large separation between the dual beams of infrared sensitivity, accordingly when detector 10 is mounted on the ceiling of a room, it is likely that an intruder will walk sequentially into each of the dual beams formed by each window segment, and will thereby be detected. If an intruder simultaneously enters into both beams of infrared sensitivity for a window segment, there will be little detectable change in the difference between the infrared radiation sensed by the two electrodes. The selected spacing of about 4 mm provides an angular spacing between beam centers of a set of dual beams of infrared sensitivity from each of the segments of window 22 of about $\frac{1}{4}$ to $\frac{1}{3}$ of the angular separation between centers of each set of dual beams formed by adjacent window segments. Accordingly, if the angle between beams formed by adjacent window segments 30A and 30B is approximately 30°, it is appropriate that the separation between electrodes 60 and 62, when viewed from the center of the Fresnel focusing lens 40, illustrated in FIG. 22 be preferably about 7° to 10°. The angular separation is dependent on the expected ceiling height and should be at least about 5°.

While there have been described what is believed to be the preferred embodiments of the present invention, those skilled in the art will recognize that other and further modifications may be made thereto without departing from the spirit of the present invention, and it is intended to claim all such changes and modifications as fall within true scope of the invention.

We claim:

1. In an optical system for a device having an enclosure with an aperture, an optical transducer within said enclosure and focusing means, having at least one optical axis for focusing radiation passing through said aperture onto said transducer, the improvement comprising a light deflecting window mounted in said aperture and formed of refractive material, said window having an outer surface portion formed as a plurality of parallel ridges formed by intersecting planes, said intersecting planes having apex angles arranged to internally reflect radiation between the direction of said optical axis within said enclosure and a selected viewing angle outside said device, said internal reflection occurring on an underside of said outer surface.

2. The improvement specified in claim 1 wherein said intersecting planes have substantially equal angles with respect to said optical axis such that said radiation is reflected between the direction of said optical axis and two viewing angles having opposite relation to said optical axis.

3. The improvement specified in claim 1 wherein said focusing means comprises a focusing lens between said window and said optical transducer.

4. The improvement specified in claim 3 wherein said focusing lens is formed on the inner surface of said window.

5. The improvement specified in claim 4 wherein said focusing lens comprises a Fresnel lens.

6. The improvement specified in claim 3 wherein said focusing lens comprises a Fresnel lens.

7. The improvement specified in claim 1 wherein said outer surface of said window has a plurality of surface portions, and wherein each of said surface portions has parallel ridges with selected different ridge directions on said surface to internally reflect light between said optical axis and different viewing angles.

8. In a passive infrared intrusion detector having an infrared sensing element mounted within an enclosure, an aperture in said enclosure for receiving infrared energy to be detected and means having at least one optical axis for focusing infrared energy passing through said aperture onto said detector, the improvement comprising a window formed of refractive material and mounted in said aperture, said window having an outer surface portion formed as a plurality of parallel ridges formed by intersecting planes, said intersecting planes having angles arranged to internally reflect radiation originating from a region of space at a desired viewing angle in a plane perpendicular to said ridges to a direction corresponding to and substantially parallel with said optical axis, said internal reflection occurring on the underside of said outer surface.

9. A passive infrared intrusion detector arranged to be mounted above an area to be protected in a downwardly facing orientation, comprising an infrared sensing element mounted within an enclosure, a downwardly facing aperture on said enclosure for receiving infrared energy to be detected, and means, having at least one optical axis, for focusing infrared energy passing through said aperture onto said detector, and a window over said aperture formed of refractive material and having an outer surface having a portion formed as a plurality of parallel ridges formed by intersecting planes, said planes having apex angles arranged to internally reflect radiation between the direction of said optical axis and a selected viewing angle outside said enclosure, said internal reflection occurring on the underside of said outer surface.

10. A passive infrared intrusion detector as specified in claim 9 wherein said window has a plurality of said portions on said outer surface, with each of said surface portions having said ridges at different ridge directions on said surface such that radiation is reflected between a plurality of said viewing angles and the direction of said optical axis.

11. A passive infrared intrusion detector as specified in claim 10 wherein said window includes a planar portion.

12. A passive infrared intrusion detector as specified in claim 10 wherein said window further includes further segments, inclined with respect to said optical axis and said ridge bearing surface, said further segments having focusing lenses formed thereon for focusing infrared radiation from additional viewing angles onto said detector.

13. A passive infrared intrusion detector as specified in claim 10 wherein said window includes a Fresnel lens on its inner surface.

14. A passive infrared intrusion detector arranged to be mounted above an area to be protected in a downwardly facing orientation, comprising an infrared sensing element mounted within an enclosure, a downwardly facing aperture on said enclosure for receiving infrared energy to be detected, and means, having at least one optical axis, for focusing infrared energy passing through said aperture onto said detector, and a window over said aperture formed of refractive material and having an outer surface having a portion formed as a plurality of parallel ridges formed by intersecting planes, said planes having apex angles arranged to internally reflect radiation between the direction of said optical axis and a selected viewing angle outside said enclosure, wherein said window has a plurality of said portions on said outer surface, with each of said surface portions having said ridges at different ridge directions on said surface such that radiation is reflected between a plurality of said viewing angles and the direction of said optical axis, wherein said window further including segments, inclined with respect to said optical axis and said ridge bearing surfae, said segments having focusing lenses formed thereon for focusing infrared radiation from additional viewing angles onto said detector, and wherein said sensing element is a multiple electrode sensing element, and wherein the distance between said electrodes is selected so that the angle between said electrode centers, as viewed from said focusing means, is at least 5°.

* * * * *